Jan. 25, 1944. B. H. MANN, JR 2,339,867
MULTIPLE VALVE CONTROL
Filed July 28, 1942

INVENTOR
BERTRAM H. MANN JR.
Donald U. Rich
ATTORNEY

Patented Jan. 25, 1944

2,339,867

UNITED STATES PATENT OFFICE 2,339,867

MULTIPLE VALVE CONTROL

Bertram H. Mann, Jr., Webster Groves, Mo., assignor to Carter Carburetor Corporation, St. Louis, Mo., a corporation of Delaware Application July 28, 1942, Serial No. 452,582

4 Claims. (Cl. 137—144)

This invention relates to multiple valves having joint controls. Where one or more fluid streams are controlled by multiple valves, it may be desirable to operate one valve in accordance with the positioning of the other valve and to provide an indication as to such joint operation. In the present embodiment, two fluid streams are caused to join in a mixture duct, the duct and one of the component streams having controlling valves therein. The mixture duct valve is controlled by the operator and the other valve is provided with means for yieldingly closing the same. There is also provided interconnecting means between the valves whereby when the mixture duct valve is opened beyond a predetermined degree, the other valve is forced partially open. Just prior to such enforced opening, the opening of the mixture duct valve is momentarily resisted so as to indicate to the operator the impending enforced opening of the other valve.

In the accompanying drawing which illustrates the invention:

Figure 1:
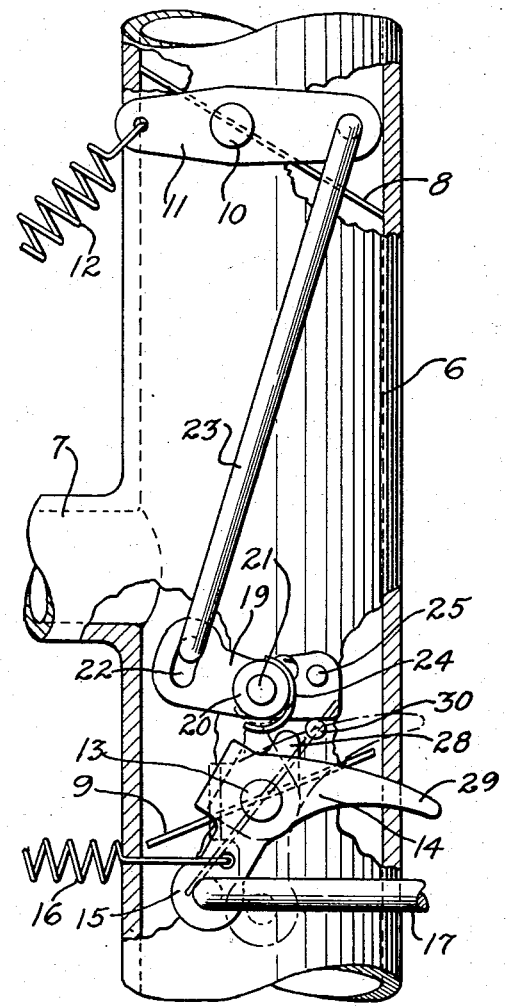
Fig. 1 is a partial view of a fluid system including multiple valves having the novel joint control applied thereto.

In the drawing, a piece of pipe 6 has a pipe 7 joined thereto between pivoted butterfly valves 8 and 9. Valve 8 is carried on a shaft 10 having a crank 11 rigid therewith. This crank and valve 8 are urged counterclockwise by a tension spring 12. Valve 9 is carried on a shaft 13 on which a crank arm 14 is rigidly fastened. Arm 14 has a projecting lobe 15 to which is secured a coiled spring 16 which normally urges the arm clockwise in a direction to close valve 9. Also connected to lobe 15 is a rod 17 which extends to a suitable control handle or button for manual operation.

A member 19 has a boss 20 rotatably receiving a pintle 21 adjacent arm 14 and has a slot 22 in one portion receiving the lower end of a link 23 secured at its upper end to lever 11 opposite spring 12. A curved spring strip 24 is secured to pintle receiving boss 20 on member 19 and extends partially therearound. An eccentric pin 25 projects from member 19 on the side thereof opposite slot 22.

Projecting upwardly from operating arm 14 on valve 9 is a short finger 28 in position to engage spring strip 24 during opening of this valve. A second, longer finger 29 on arm 14 is constructed so as to engage outwardly projecting pin 25 on member 19 after valve 9 has been substantially opened. A stop pin 30 on the wall of pipe 6 limits clockwise rotation of member 19.

Figure 2:
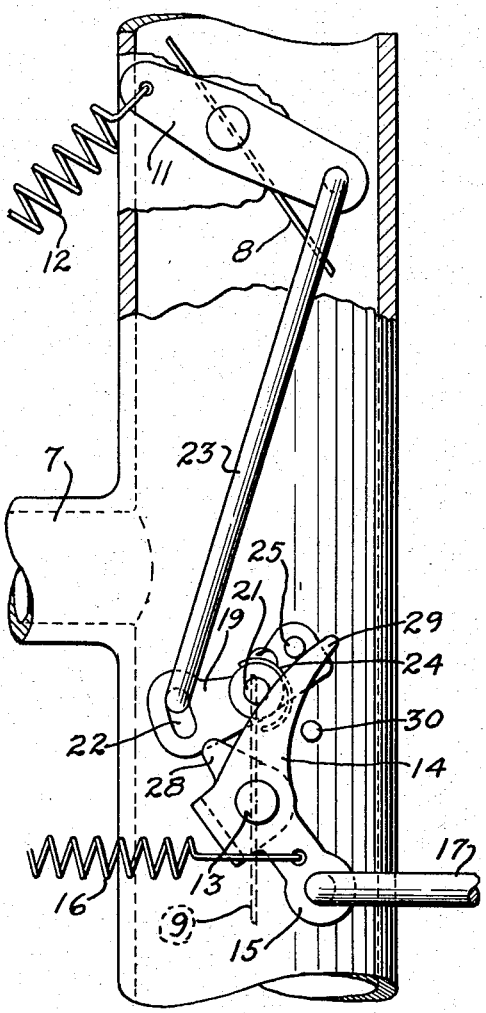
Fig. 2 is a view similar to Fig. 1 but showing the valves in different positions.
Figure 3:
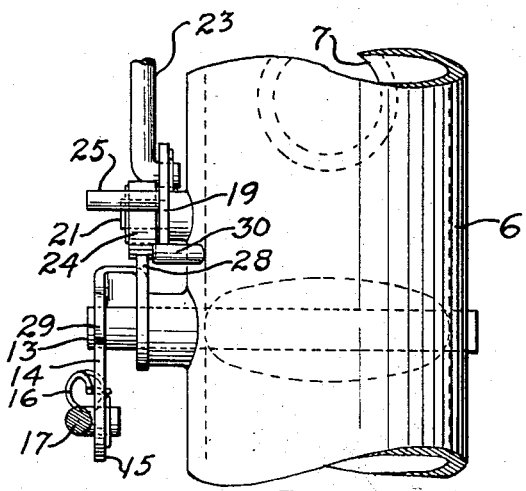
Fig. 3 is a view taken at 90° to Fig. 1.

This mechanism operates as follows:

When valve 8 is yieldingly closed by spring 12, leaf spring 24 is in position to be engaged by short finger 28 on control arm 14, when valve 9 is opened to the broken line position in Fig. 1. Continued opening of valve 9 distorts spring strip 24 allowing finger 28 to pass over and beyond the same, as in Fig. 2, but the resistance of the spring strip is sufficient to be momentarily felt by the operator. Just before valve 9 reaches its full open position, longer finger 29 on the control arm engages pin 25 on pivoted member 19 and rotates this member counterclockwise so as to draw downwardly on link 23 and force valve 8 partially open against the tension of spring 12.

Thus, the quantity of fluid passing through the upper portion of pipe 6 is automatically increased when manual valve 9 has been substantially fully opened, but a momentary indication is given to the operator by over-center spring 24 prior to such opening of valve 8, so that the manual valve has a considerable range of manual movement without the danger of affecting upper valve 8, in case this is not desired.

An example wherein this type of multiple valve control has particular utility is an automotive carburetor in which it is frequently desired to open the choke valve, otherwise automatically controlled, during starting of the engine so as to "sweep out" excessive fuel which may have been lodged in the engine manifold. The invention, however, is not limited to this use and, further, may be modified as will occur to those skilled in the art and the exclusive use of all modifications as come within the scope of the appended claims is contemplated.

I claim:

1. In combination with a fluid duct having first and second valves therein, means to yieldingly close said first valve, a manual control for said second valve, a one-way operative connection between said valves for positively opening said first valve responsive to substantial opening movement of said second valve, and a yielding element mounted adjacent said control and independently thereof and positioned to be momentarily engaged by said control during opening of said second valve to sensibly indicate impending opening of said first valve thereby.

2. In combination with a fluid duct having first and second valves therein, means to yieldingly close said first valve, a manual control for said second valve, an operative connection between said valves for positively opening said first valve when said second valve is substantially opened, and a resilient element mounted on the duct wall adjacent said control and in position to be engaged momentarily by said control during opening of said second valve and prior to opening of said first valve thereby to sensibly indicate to the operator impending opening of said first valve.

3. In combination with a fluid duct having first and second valves therein, a yielding control for said first valve, a manual control for said second valve, an operative connection between said valves for positively actuating said first valve responsive to substantial movement of said second valve in one direction, and a snap over spring device mounted on the duct wall adjacent said control, said device being movable with said first valve to a position to momentarily engage said control and sensibly resist movement of said second valve in the mentioned direction prior to actuation of said first valve thereby.

4. In combination with a fluid duct having first and second valves therein, means to yieldingly close said first valve, a manual control arm for said second valve, an operative connection between said valves for positively opening said first valve when said second valve is substantially opened, a snap over spring device mounted independently of said control arm and movable with said first valve to a position to be engaged by said arm when said second valve has been opened to a predetermined position but, prior to opening of said first valve thereby, to sensibly indicate to the operator the arrival of said second valve to said position.

BERTRAM H. MANN, Jr.